June 14, 1932. W. F. RESCHKE 1,862,907
FEED GRINDING MILL
Filed July 20, 1929 2 Sheets-Sheet 1
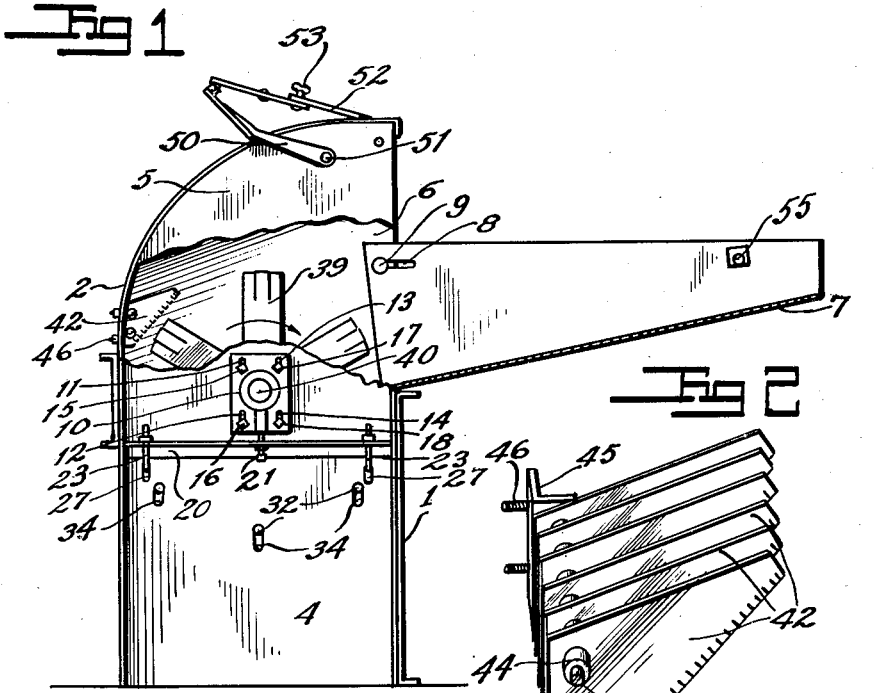
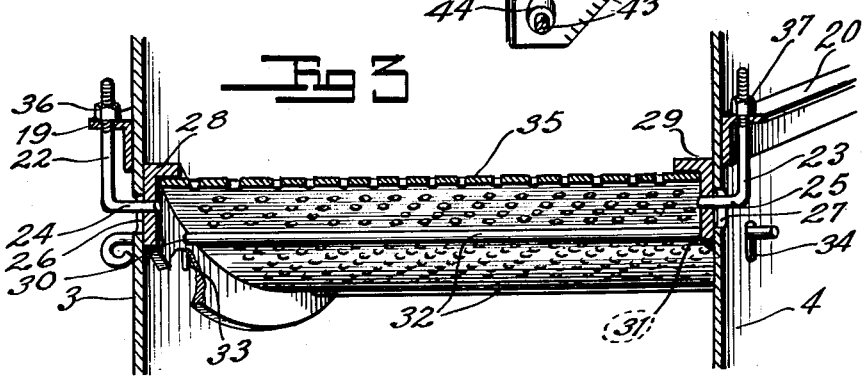
INVENTOR
William F. Reschke
BY
B. F. Funk ATTORNEY June 14, 1932. W. F. RESCHKE 1,862,907
FEED GRINDING MILL
Filed July 20, 1929 2 Sheets-Sheet 2
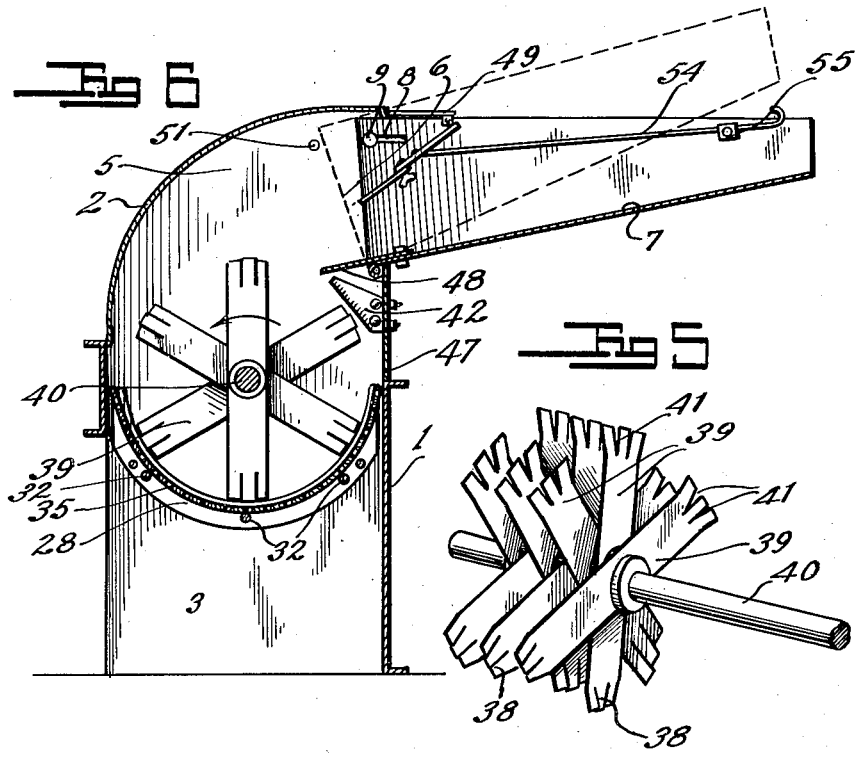
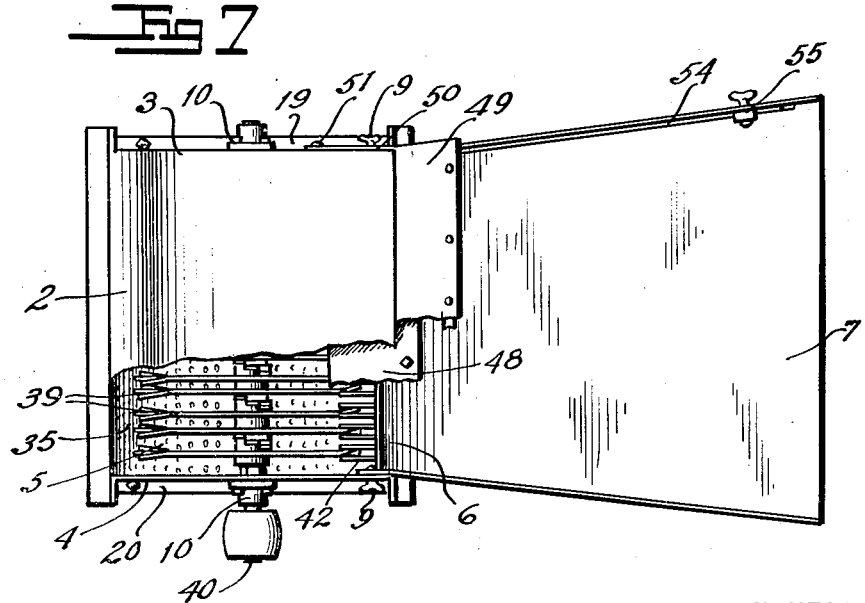
INVENTOR
William F. Reschke
BY
B. F. Funk ATTORNEY Patented June 14, 1932

1,862,907

UNITED STATES PATENT OFFICE

WILLIAM F. RESCHKE, OF WICHITA, KANSAS

FEED GRINDING MILL

Application filed July 20, 1929. Serial No. 379,728.

This invention relates to a feed grinding mill and it is particularly designed to grind various kinds of vegetable matter. The invention contemplates a vegetation grinding mill in which the concave is adjustable with respect to the cylinders or knives and one in which the cylinder may be easily removed in the event that the mill becomes choked. Provision is made for feeding coarse or fine material to the mill and means is provided for regulating the feed.

Other advantages and novel features of the invention will be apparent by reference to the following description in connection with the accompanying drawings in which:

Fig. 1 is a side elevational view of a mill constructed in accordance with my invention, parts being broken away to better illustrate certain other parts.

Fig. 2 is a perspective view of a gang of stationary knives or cutters.

Fig. 3 is a perspective sectional view through the concave, the adjusting means being shown in elevation.

Fig. 4 is a detail view of one of the cylinder blades and part of the concave.

Fig. 5 is a perspective view of the cylinder or cutting knives.

Fig. 6 is a vertical cross-sectional view of the mill showing the parts arranged for cutting relatively fine material and Fig. 7 is a top plan view of the mill, part of the hood being broken away.

The mill is shown as comprising a front 1, a back 2 and two sides 3 and 4, the sides having curved upper edges over which the back 2 is bent so as to form a hood 5 into which the material may be fed. The open front portion 6 may be provided with a feed trough 7 having a horizontal elongated slot 8 on each side through which a supporting pin 9 may project so that the trough can be tilted to the proper angle and maintained in such a position, it being understood that the pins 9 are headed bolts with nuts on their ends. Each side carries a bearing plate 10 with vertical slots 11, 12, 13 and 14 through which bolts 15, 16, 17 and 18 may project, the bolts being extended through the sides of the casing so that the bearing plates may be vertically adjusted for relatively coarse adjustment.

The sides of the casing are provided with angles 19 and 20 through which drift screws 21 project to effect a finer adjustment. The angles 19 and 20 carry pairs 22 and 23 of adjusting bolts having inturned hooked ends 24 and 25 which project through slots 26 and 27 in the sides of the casing and engage segmental or arcuate angles 28 and 29 having perforations or holes 30 and 31 in their vertical flanges through which removable cylinder supporting rods 32 extend. These rods also extend through the slots 33 and 34 in the sides of the casing and they are spaced from the horizontal flanges of the angles 28 and 29, distances equal to the thickness of the arcuate cylinder plate or screen 35. The bolts 22 and 23 have nuts 36 and 37 which rest upon the flanges 19 and 20 so that the concave can be adjusted toward the ends 38 of the cylinder knives 39 on shaft 40 which are carried by the bearing plates 10. The knives of the cylinder are slit at 41 and have the slitted portions bent out of line as indicated in Figure 5 so that an efficient cutting action on the vegetation will be effected.

In Figure 1 I have shown a gang of triangular knives 42 spaced on the rods 43 by spacers 44 connected to the angle 45 and fastened to the casing by stud bolts 46. Therefore, as the material is fed into the machine, the coarser cut will be effected between the knives 39 and the knives 42, the finer subdividing of the material being effected between the cylinder and the perforate concave plate 35. Where finer material is to be acted upon, the knives 42 will be reversed, that is, they will be fastened to an insertable plate 47 in the front of the machine so that the trough 7 will be raised to the top of the inlet opening and the trough will have a forwardly extending plate 48 overlapping the knives 42. The feed through the trough 7 can be regulated by a pivoted choke plate 49 fastened to the arms 50 pivoted to the casing at 51. The plate has an extensible lip 52 fastened by set screws 53 and it may be swung in an arc through the medium of an actuating rod 54 resting upon the guide 55.

It will be apparent from the foregoing that the mill is adapted to treat coarse or fine material, that adjustment may be made for wear between the cylinder and concave and that the device is simple in construction and efficient in operation.

What I claim and desire to secure by Letters-Patent is:—

1. A feed grinder comprising a casing, a cylinder and concave in the casing, a gang or fixed cutting knives above the concave and means for interchangeably connecting the knives to the front and back of the casing.

2. A feed grinder comprising a casing having angle irons on the outer faces of opposite walls, curved angle irons on the inner faces of said walls, drift screws carried by the first named angle irons and having inturned ends passing through slots in the casing, engaging the second mentioned angle irons, a screen in the casing and transverse rods projecting through slots in the casing to removably hold the screen against flanges of the second mentioned angle irons.

In testimony whereof I affix my signature.

WILLIAM F. RESCHKE.